(12) United States Patent    (10) Patent No.: US 7,510,470 B2
Arts                         (45) Date of Patent:    Mar. 31, 2009

(54) SAFE ROOMS AND OTHER SUCH SPACES AND AIR PROCESSING SYSTEMS FOR SUCH SAFE ROOMS AND SPACES

(76) Inventor: Theodore A. M. Arts, 312 Countryside La., Williamsville, NY (US) 14221

( * ) Notice: Subject to any disclaimer, the term of this patent is extended or adjusted under 35 U.S.C. 154(b) by 85 days.

(21) Appl. No.: 11/191,441

(22) Filed: Jul. 27, 2005

(65) Prior Publication Data

US 2006/0286921 A1    Dec. 21, 2006

Related U.S. Application Data

(60) Provisional application No. 60/591,352, filed on Jul. 27, 2004.

(51) Int. Cl.
*B01L 1/04* (2006.01)
(52) U.S. Cl. .................................... 454/187
(58) Field of Classification Search ............. 454/187, 454/238–242, 351–352, 333, 337; 422/105, 422/115; 55/467; 62/186, 317
See application file for complete search history.

(56) References Cited

U.S. PATENT DOCUMENTS 4,368,843 A  *  1/1983  Kai et al. .............. 236/49.3
5,090,972 A      2/1992  Eller et al.
5,279,609 A  *  1/1994  Meckler ................ 236/49.3
5,693,188 A  * 12/1997  Donnohue et al. ......... 202/118
6,572,468 B1    6/2003  Sasaki et al.
6,869,457 B2    3/2005  Nakagawa

* cited by examiner

*Primary Examiner*—Steve McAllister
*Assistant Examiner*—Helena Kosanovic
(74) *Attorney, Agent, or Firm*—Lerner, David, Littenberg, Krumholz & Mentlik, LLP (57) ABSTRACT

In one example, an air processing system comprises an inlet portion defining a first inlet to receive internal air from a room and a second inlet to receive air external to the room. An air decontamination portion is downstream of the inlet portion. A first outlet portion to the room is downstream of the air decontamination portion. A HEGA filter is downstream of the first outlet. A first damper is downstream of the air decontamination portion and upstream of the HEGA filter to selectively direct air to the first outlet and the gas absorber. A second damper and a second outlet are downstream of the HEGA filter. The first and second dampers are configured and positionable to selectively seal an upstream side and a downstream side of the gas absorber, respectively, when not in use. Safe rooms including the system are also disclosed.

29 Claims, 8 Drawing Sheets

SAFE ROOMS AND OTHER SUCH SPACES AND AIR PROCESSING SYSTEMS FOR SUCH SAFE ROOMS AND SPACES

RELATED APPLICATION

The present application claims the benefit of U.S. Provisional Application No. 60/591,352, which was filed on Jul. 27, 2004, and is incorporated by reference herein.

FIELD OF THE INVENTION

Safe spaces, such as safe rooms, and air processing systems for such safe spaces and rooms including control of air flow and/or selective filtration.

BACKGROUND OF THE INVENTION

Establishment of positive pressure in a room or other such enclosed space may prevent or decrease the entry of foreign substances into the space. Ordinary usage of the space, however, may cause a loss of the positive pressure that may allow the entry of foreign substances. For example, opening of a door or a window of a room may cause a loss of the positive pressure as air rushes out of the room to the lower pressure air outside of the room. Maintenance of the positive pressure during ordinary usage is a challenge.

In clean rooms used in highly sensitive manufacturing processes, such as semiconductor and pharmaceutical manufacturing, positive pressure is one of several protective features used to prevent contamination. To enable entry and exit of a room by personnel without losing the positive pressure, an airlock is typically provided at each passageway into and out of the room. This first airlock is coupled to a transition room that has its own, second airlock to the exterior of the system. One enters the transition room through the second airlock when the transition room is at the same pressure as the exterior air. The second airlock is closed and the pressure in the transition room is raised to match the pressure in the clean room. The first airlock is then opened and the clean room may be entered without a drop in the positive pressure in the room. In this way, the positive pressure is maintained. Other protective features to prevent contamination include the use of special clothing, slippers, masks, and cleaning procedures. On leaving the clean room, the user enters the same or another transition room at the same positive pressure as the safe room and the safe room airlock is closed. Then the user leaves the transition room through the second airlock. While effective, the use of airlocks and transition rooms is a complicated and expensive solution to the problem, which also requires a lot of space.

Hospitals also provide positive pressures in operating rooms to keep out contamination. Typically, airlocks are not used in operating rooms due to the cost and time delays involved. Some pressure drops are therefore tolerated when doors are opened for short periods of time. However, if a door is opened for a period of time that may result in a deleterious loss of pressure, such as 15-30 seconds, for example, an alarm may sound to alert users to check the door. Hospitals may also provide positive pressures in rooms containing patients with compromised immune systems to decrease the risk of infection.

Protection of individuals in their home against a chemical, biological or radiological incident, such as a terrorist attack or an accident, is of increasing concern. It has been recommended after a chemical, biological, or radiological terrorist attack, that doors and windows in a selected room in a house or apartment be sealed with plastic and masking tape to keep out dangerous substances. The degree of protection depends in part of the effectiveness of the sealing. While better sealing better prevents the entry of dangerous substances into the room, it may also prevent the entry of oxygen. Since the oxygen in a room may eventually be depleted, such a sealed room may only be occupied for a relatively short period of time.

SUMMARY OF THE INVENTION

In accordance with one embodiment of the invention, an air processing system is disclosed comprising a first inlet to receive air from a space, a second inlet to receive air external to the space, and a first outlet to the space. An air filtration portion is downstream of the first outlet. A second outlet to the space is downstream of the air filtration portion. A valve is provided to selectively direct air between the first outlet and the second air filtration portion. In this way, air may only pass through the air filtration portion if filtration is desired or necessary. The valve may be controlled by a manual switch, for example. Alternatively or in addition, the valve may be controlled by a processor based, at least in part, on data received from at least one sensor for detecting chemical or radiological agents.

The air filtration portion preferably comprises a high efficiency gas absorber. The valve may comprise a first sealing damper selectively positionable to open the first outlet and to seal an upstream side of the gas absorber, and to close the first outlet and not seal the upstream side of the gas absorber. A second sealing damper may be provided downstream of the gas absorber, positionable to selectively seal a downstream side of the gas absorber and close the second outlet when the first outlet is open, and to open the second outlet when the first outlet is closed. By sealing the gas absorber when not in use, the life of the gas absorber may be extended.

In accordance with another embodiment of the invention, an air processing system is disclosed comprising a first inlet to receive air from a space, a second inlet to receive air external to the space, and an air filtration portion downstream of the first and second inlets to receive air from the first and second inlets. An outlet is provided to the space, downstream of the air filtration portion. A valve is provided to selectively vary a proportion of air from the space and external air received by the first and second inlets, respectively. The air filtration portion may comprise an air decontamination system. The valve may selectively vary the proportion based, at least in part, on a change in a condition of the space. The addition of external air to the room air in the system creates a positive pressure in the space, that may prevent or decrease the entry of contaminants into the space. A change in a condition, such as a state of an opening to the space or the pressure in the space, for example, may result in a loss or decrease of positive pressure in the room. Additional external air may be required to maintain an air flow out of the room, to continue to prevent or decrease the entry of contaminants. The space may be a room and the opening may be a door or window of the room. At least one sensor may be provided to detect the condition of the space. A processor may be coupled to the sensor and to the valve to selectively control operation of the valve based, at least in part, on data provided by the sensor.

The system may further comprise an inlet portion defining, at least in part, the first inlet and the second inlet. The valve may comprise a damper in the inlet portion, configured to define the proportion of air from the space and external air received by the system. The damper is selectively positionable in the inlet portion to selectively change the proportion.

In accordance with another embodiment of the invention, a safe space is disclosed comprising a space that is at least partially enclosed and an air processing system coupled to the space to process air in the space. The air processing system comprises an inlet portion defining a first inlet to receive internal air from the space and a second inlet to receive external air external to the space. An air decontamination portion is downstream of the inlet portion and an outlet portion is downstream of the air decontamination portion to allow processed air to enter the space from the air processing system. The inlet portion is adapted to vary quantities of internal air and external air through the first and second inlets, respectively, based, at least in part, on a condition in the space. As above, the outlet of a combination of internal air and external air into the space from the air processing system creates a positive pressure in the space, which is advantageous. The space may be a room, for example. The ability to vary the quantities of internal and external air based on a condition in the space assists in maintaining the positive pressure if a condition changes, such as if a door or window is opened.

The system may further comprise a high efficiency gas absorber downstream of the air decontamination portion and a second outlet downstream of the gas absorber. A valve is provided to selectively direct air to the first outlet or to the gas absorber. The gas absorber may be sealed when not in use, by sealing dampers, for example, to prolong the life of the absorber.

In accordance with another embodiment, a safe space is disclosed comprising a space that is at least partially enclosed and an air processing system comprising a first inlet to receive air from the space, a second inlet to receive air external to the space, and a first outlet to the space. An air filtration portion is downstream of the first outlet. A second outlet to the space is downstream of the air filtration portion. A valve is provided to selectively direct air between the first outlet and the second air filtration portion.

In accordance with another embodiment, a safe room is disclosed comprising a room and an air processing system coupled to the room to process air in the room. Here, the air processing system comprises an inlet portion defining a first inlet to receive internal air from the room and a second inlet to receive external air external to the room. An air decontamination portion is downstream of the inlet portion. A first outlet portion is downstream of the air decontamination portion to allow processed air to enter the room from the air processing system. A high efficiency gas absorber is downstream of the first outlet. A first damper is downstream of the air decontamination portion and upstream of the gas absorber to selectively direct air to the first outlet and the gas absorber. A second damper and a second outlet are downstream of the gas absorber. The first and second dampers are configured and positionable to selectively seal an upstream side and a downstream side of the gas absorber, respectively.

In accordance with another embodiment of the invention, a method of processing air is disclosed comprising receiving air from a first location and receiving air from a second location, in a first proportion; filtering the air; returning the air to the first location; and changing the proportion in response to a change in a condition of the first location. The method may further comprise establishing a positive pressure in the first location. The method may comprise selectively filtering the air by a high efficiency gas absorber filter. The method may also further comprise decontaminating the air. The condition may be an air pressure in the space and the method may comprise changing the proportion in response to detecting a change in the air pressure in the space. The space may be a room and the condition may be a state of a door or window in the room. The method may then comprise changing the proportion in response to detecting an opening of either the door or window in the room.

In accordance with another embodiment, a method is disclosed comprising receiving air to be filtered, filtering the air a first time, and selectively filtering the air a second time by a high efficiency gas absorber. The method may further comprise filtering the air the first time by decontaminating the air. The method may further comprise selectively directing air between a first outlet and the high efficiency gas absorber, after filtering the air the first time. The method may further comprise detecting a chemical or radiological agent by at least one sensor and filtering the air the second time if the chemical or radiological agent is detected.

In accordance with another embodiment of the invention, an air processing system is disclosed comprising a high efficiency gas absorber, at least one sensor coupled to the absorber to detect at least one chemical or radiological agent, and a blower to move air through the absorber. The blower is coupled to the at least one sensor. The blower is activated based, at lease in part, on data received from the at least one sensor. The at least one sensor may be adapted to detect carbon monoxide, for example. A first sealing damper may selectively seal an inlet side of the absorber and a second sealing damper may selectively seal an outlet side of the gas absorber. Movement of the first and second damper is may based, at least in part, on data received from the at least one sensor.

DETAILED DESCRIPTION OF THE PREFERRED EMBODIMENTS

In embodiments of the invention, safe rooms and air processing systems are disclosed for use in safe rooms or other enclosed spaces. In one example, the air processing system creates a positive pressure in a room by drawing air from the room ("room air") and drawing air external to the room ("external air") into the system. The room air and the external air are combined, processed, and provided to the room. The air drawn into the system is preferably decontaminated prior to being returned to the room. Air decontamination may be provided all the time or only when needed or desired. Since more air is provided to the room than is withdrawn from the room, a positive pressure is created in the room. The positive pressure decreases or prevents the leakage into the room of external air, which may be contaminated by a chemical, biological, or radiological incident, such as a terrorist attack or an accident, for example. External air may leak into a room through the space at a bottom of a door, around the edges of doors and windows, and through electrical outlets, ceiling light fixtures, and cracks in walls, for example. Typically, a small amount of external air and a large amount of room air are drawn into the air processing system, under normal circumstances. To better maintain the positive pressure if a door or window of the room is opened, in accordance with one embodiment, the system automatically increases the amount of external air and decreases the amount of room air drawn in. In other words, the proportion of external air to room air is increased.

In accordance with another embodiment, the system includes a high efficiency gas absorber ("HEGA") fitter to provide further filtration of the air, if needed. For example, gas absorption may be advantageous after a biological, chemical or radiological incident. When not in use, the HEGA filter is preferably sealed.

The air processing systems of the present invention may be readily and economically incorporated into any room in a house, apartment, or office to create a safe room, providing protection for individuals and families from chemical, biological, and radiological incidents. The room may be in a house, an apartment building, or an office building, for example. In addition to rooms, the air processing system of embodiments of the present invention may be used with any space that is sufficiently enclosed to maintain a positive pressure, such as a tent, a hood, or a curtained area. A patient in a bed or wheelchair may be wholly or partially surrounded by a curtain to provide isolation, for example. A "safe space" may thereby be created.

Figure 1:
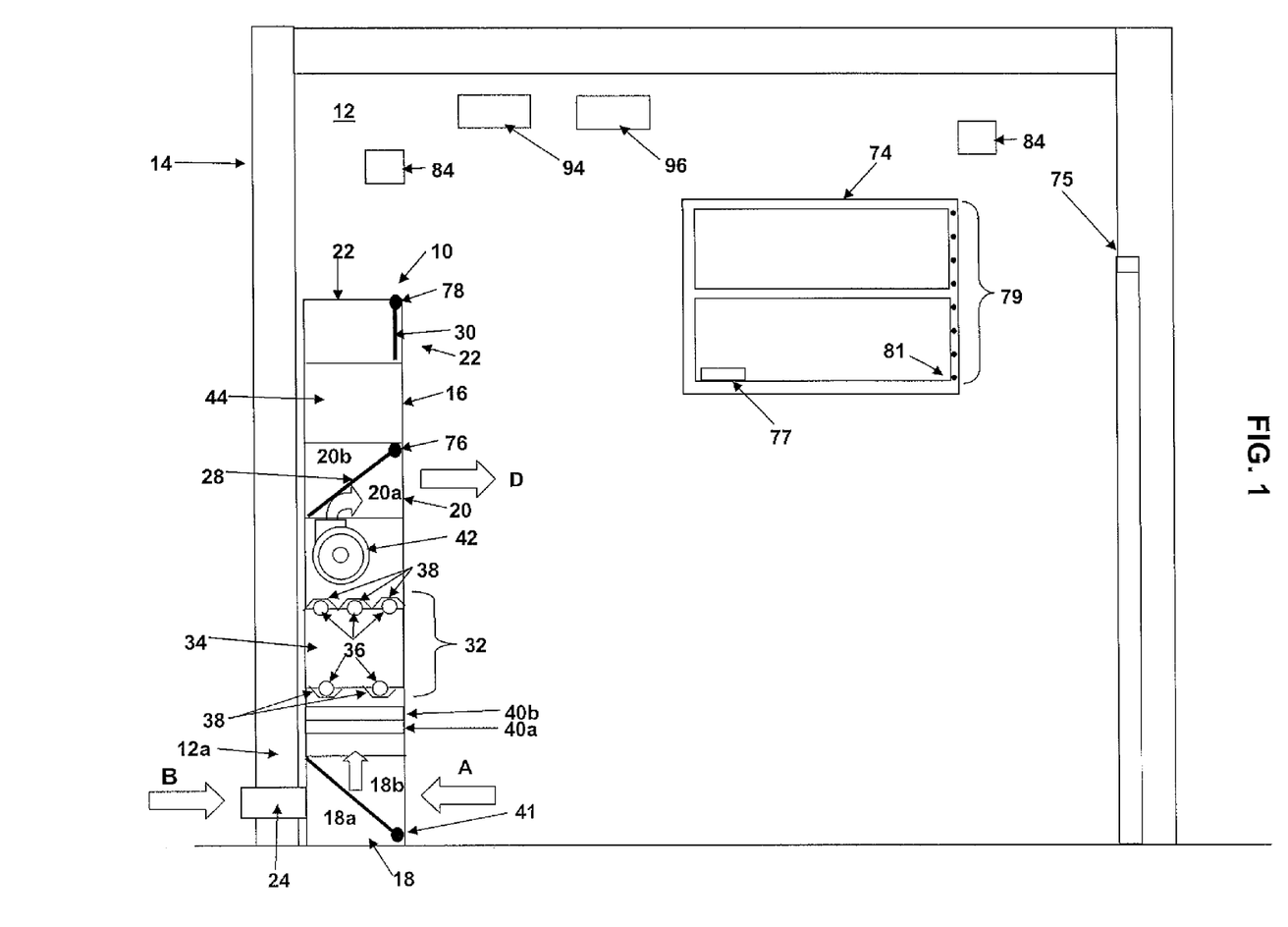
FIG. 1 is schematic cross-section of an example of an air processing system in a safe room, in accordance with one embodiment of the invention.

FIG. 1 is schematic cross-section of an example of an air processing system 10 for a room 12 to form a safe room 14, in accordance with one implementation. The system 10 may be inside or outside of the room 12. In this example, the system is inside of the room 12. The system 10 comprises a housing 16 with an inlet portion 18, a first outlet portion 20, and a second outlet portion 22. The inlet portion 18 allows entry of room air A and external air B into the device. The first and second outlet portions 20, 22 allow air to exit from the system 10, into the room. The inlet portion 18 comprises a first inlet 18a to receive room air A and a second inlet 18b to receive external air B. The room air A and external air B mix in the inlet portion 18. The inlet portion 18 and the first and second outlet portions 20, 22 may include respective valves, such as dampers 26, 28, 30 to control airflow, as described further below. A grill (not shown) is preferably provided in each inlet 18a, 18b and the outlet portions 20, 22. The inlet portion 18a may include a duct attachment adaptor 24 to connect to a source of external air B or to ducting to connect to a source of external air B, if necessary. For example, the source of external air B may be outside of a building containing the safe room 14, or outside of the safe room, in another room of the building. If the system 10 is outside of the safe room 14, suitable ducting may be readily provided to draw room air A into the system and return processed air to the room.

A first air processing portion 32 is provided downstream of the inlet portion 18. The air processing portion 32 may comprise one or more filters. Preferably, the filter comprises a high efficiency particulate arrestor ("HEPA") filter 34, such as a 99.99%, 0.3 micron HEPA filter, which is readily commercially available. HEPA filters can capture airborne particles, such as soot and smoke. Biological agents, such as viruses, bacteria and spores may also be captured.

Decontamination is preferably provided, as well, to neutralize trapped biological agents. Ultraviolet germicide irradiating ("UVGI") lamps 36 may be provided upstream and/or downstream of the HEPA filter 34, for example, to irradiate one or both sides of the filter. More preferably, the UVGI lamps 36 are provided both upstream and downstream of the filter 34. The filter 34 may be a V-bank HEPA filter and the UVGI lamps 36 may be positioned within regions defined by the V's, as described in U.S. application Ser. No. 10/431,041 ("the '041 application"), filed on May 8, 2003, and PCT Publication No. WO 2004/011041 A3, which was published on Feb. 5, 2004, which are assigned to the assignee of the present invention is incorporated by reference herein. Reflectors 38 may be provided behind each UVGI lamp 36 to reflect radiation emitted in a direction away from the filter 34, towards the filter. The UVGI lamps 36 may be located at least partially within regions defined by the V's of the V-bank filter. A preferred air decontamination system is described further below with respect to FIGS. 7 and 8.

One or more prefilters 40 are preferably provided between the inlet portion 18 and the air decontamination portion 32. In this example, one prefilter 40a is provided to remove large dust particles and lint. Filtering such particles extends the life of the HEPA filter in the decontamination portion 32. An example of an appropriate pre-filter is a Grainger Part No. 6B975, available from W.W. Grainger, Inc., Buffalo, N.Y. The Grainger Part No. 6B975 is said to have a nominal depth of 2 inches, a nominal height of 12 inches, a nominal width of 24 inches, pleats per linear feet of 1.5, a median velocity (FPM) of 375, a median initial resistance of 0.16 inches, an average atmospheric efficiency of 20% to 25%, a recommended final resistance of 1.0 WC, a high initial resistance of 0.24 inches, a high velocity (FPM) of 500, a maximum temp 150° F., a media area of 9.0 square feet, a UL listing of Class 2 (R13458), an actual depth of 1¾ inches, an actual height of 11⅜ inches, and an actual width of 23⅜ inches.

Another prefilter 40b is preferably provided for odor control. The odor control prefilter may be a carbon media filter, for example. The odor control prefilter may be Grainger Part No. 6W741, available from W.W. Grainger, Inc., identified above. The Grainger Part No. 6W741 is said to be an activated carbon impregnated pleated filter, honeycomb disposable, with an air flow (FPM) of 250, and a maximum temperature of 150° F. The filter is also said to have a nominal depth of 2 inches, a nominal height of 12 inches, a nominal width of 24 inches, a height of 11⅜ inches, a depth of 1¾ inches and a width of 23⅜ inches. The airflow is said to be 250 FPM, and the maximum temperature is said to be 150 degrees F. The filter is said to comprise 2 pounds of granular charcoal media, to absorb odors and light to medium airborne chemicals. The filter 40b is said to absorb up to 60% of its weight of carbon tetrachloride ($CCl_4$) vapor under standard conditions.

In this example, a blower 42 is provided downstream of the air decontamination portion 32, to draw air into the system 10 through the inlet portion 18, prefilters 40a, 40b (if present), and the air decontamination portion 32, and to force the decontaminated air through the remainder of the system 10. It is preferred to provide the blower 42 downstream of the air decontamination portion 32 so that only decontaminated air passes through the blower. This decreases the cleaning and maintenance requirements of the blower 42, and increases its life. The blower 42 may be provided in other locations, as well. The size and power of the blower 42 depend on the size of the safe room 14 and the desired number of air exchanges per hour in the room, as is apparent to one of ordinary skill in the art. A blower 42 capable of moving 700 cubic feet per minute ("CFM") (0.33 cubic meters per second) of air may be used in a room of about 20×22×8 feet (6.1×6.7×2.4 meters), for example. Such a blower 42 can cause 12 air exchanges per hour to provide a hospital grade isolation room in accordance with standards established by the Center of Disease Control, for example. More or fewer air exchanges may be provided, by suitable selection of the blower.

In this example, the first outlet portion 20 is provided downstream of the blower 42. The first outlet portion 20 may also have an outlet grill and/or a duct attachment adaptor (not shown), if necessary or advantageous in a particular application. As mentioned above, the first outlet portion 20 preferably includes a damper 28 to selectively direct decontaminated air out of the system 10 through the first outlet 20a during normal air processing, or further downstream through the system 10 through the second outlet 20b of the first outlet portion 20 for additional processing and then to the second outlet 22 during or after a chemical, biological, or radiological incident.

A second air processing portion 44 is preferably provided downstream of the first outlet portion 20 to provide additional processing of the decontaminated air, if needed or advantageous. The second air processing portion 44 preferably comprises a high efficiency gas absorber ("HEGA") filter pack to absorb gases from a chemical or nuclear event. The HEGA filter pack may be an NBC TEDA charcoal mix, for example, available from Riley Equipment Company Inc., Part No. RS12, filed with AZM/TEDA Warfare/Nuclear Carbon, which is said to have broad chemical and nuclear absorption. The Part No. RS12 is 12 inches×12 inches×24 inches and includes about 50 pounds of the fill material to absorb up to 60% of its weight in contaminants. The size of the filter is dependent upon the size of the room and the desired duration of filtration. The longer the event, the more media is required.

Figure 3:
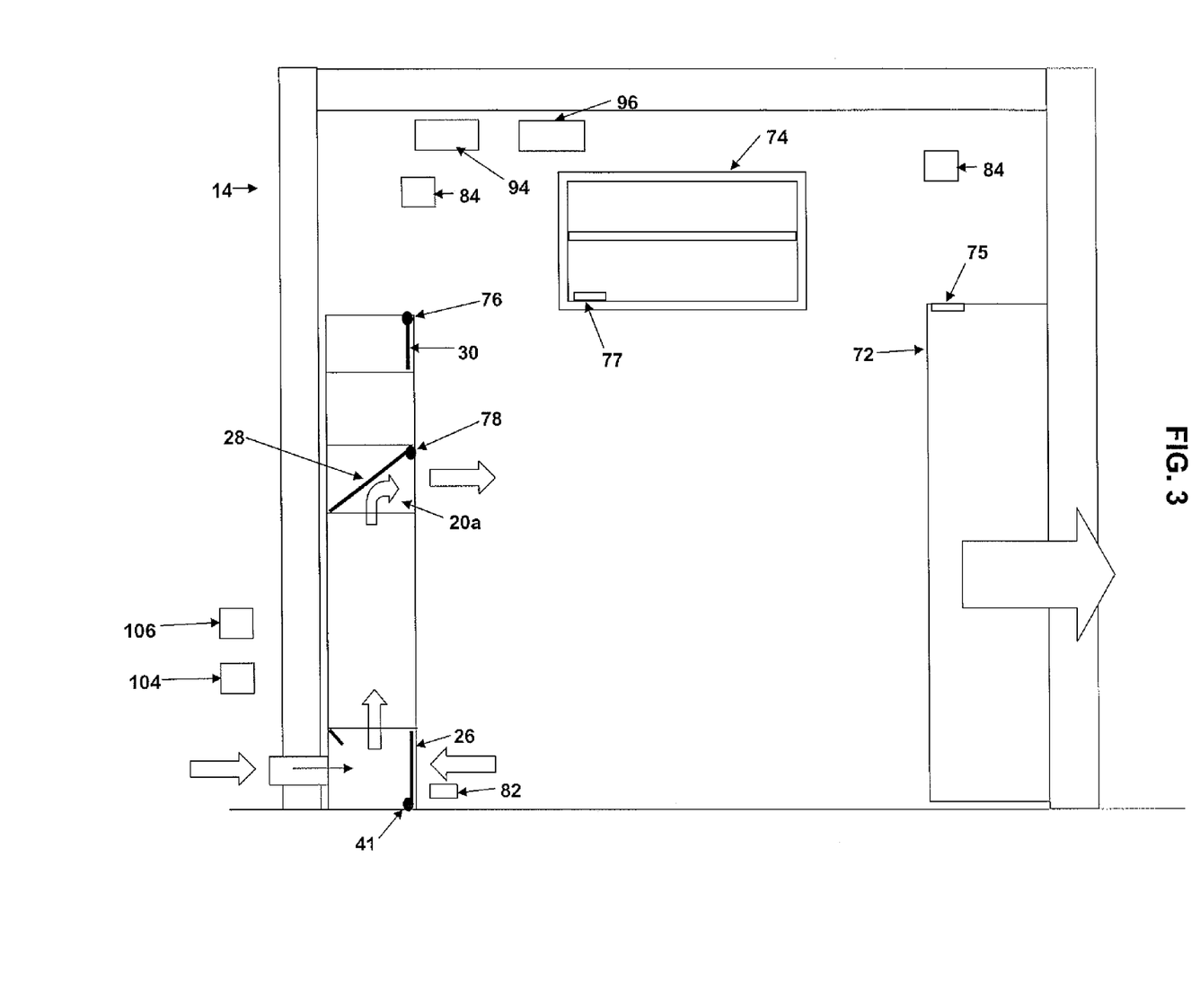
FIG. 3 shows the air processing system of the safe room of FIG. 1, after a door to the room is opened.

The second outlet portion 22 is provided downstream of the HEGA filter pack 44, with an outlet grill or duct attachment adaptor (not shown), if needed or advantageous. Air directed through the HEGA filter pack 44 exits the system 10 through the second outlet portion 22. The damper 30 in the second outlet portion 22 is preferably a sealing damper, to seal the downstream side of the HEGA filter 44 when the HEGA filter is not in use. The sealing damper 30 may be pivotally connected to the housing 16 or to a frame welded to the housing, by a hinge 78, for example. When processing by the HEGA filter 44 is not needed, the sealing damper 30 may be in one position closing of the second outlet portion 22 and sealing of the downstream side of the HEGA filter 44, as shown in FIG. 1, for example. When air processing by the HEGA filter 44 is needed, the sealing damper may be rotated about the pivot to a second position opening the second outlet 22, as shown in FIG. 3.

Figure 4:
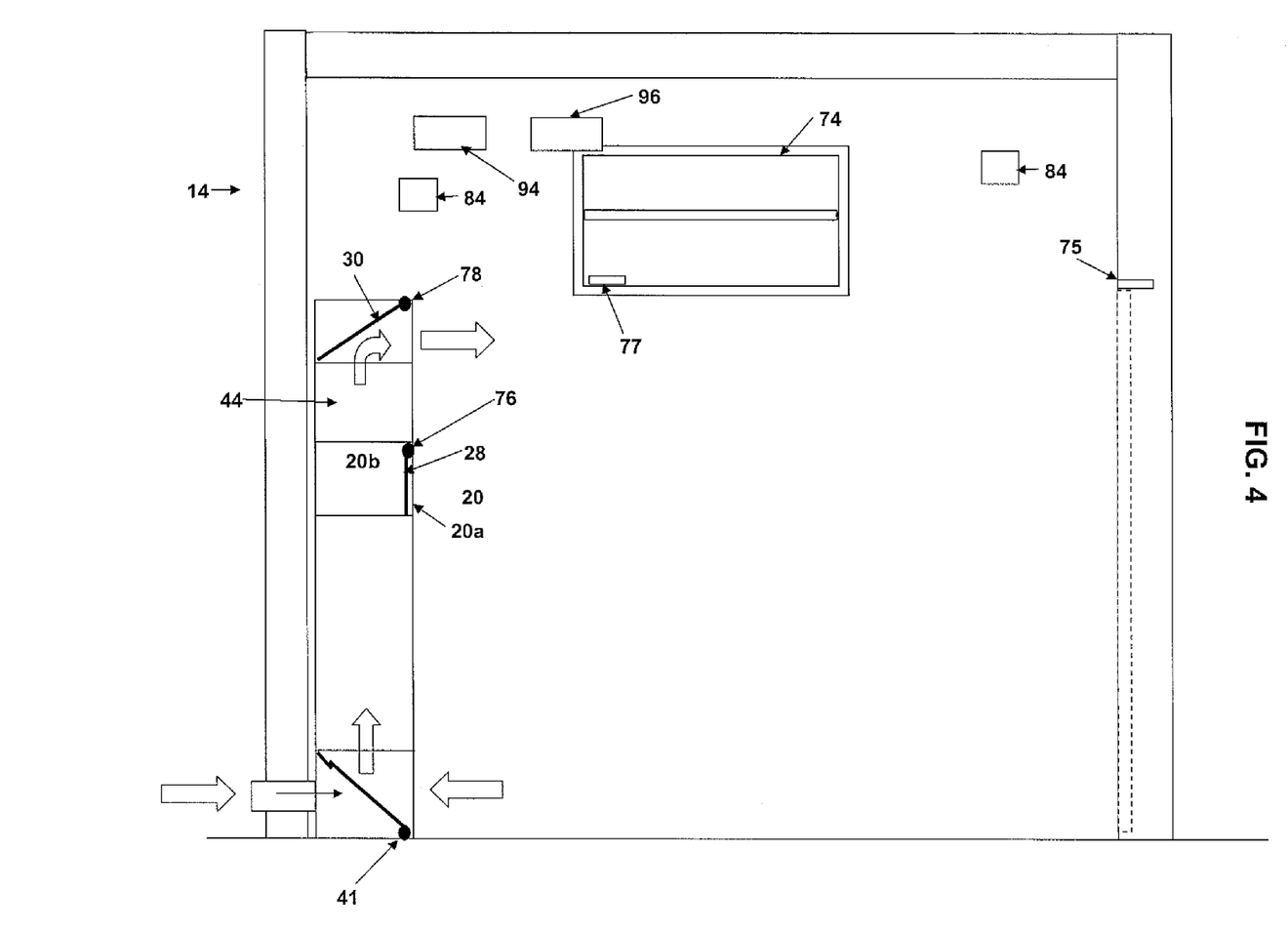
FIG. 4 shows first and second outlet dampers in first and second outlets of the air processing system of FIG. 1 in second positions to allow air flow through a HEGA filter.

The damper 28 in the first outlet portion 20 is also preferably a sealing damper, to seal the upstream side of the HEGA filter 44 when the HEGA filter 44 is not in use. The sealing damper 28 may also be pivotally connected to the housing 16 or to a frame welded to the housing, along a hinge 76, for example. The sealing damper 28 may have a first position sealing the upstream side of the HEGA filter 44 and opening the first outlet 20a when the HEGA filter is not in use, as shown in FIG. 1, for example. The sealing damper may have a second position closing the outlet 20a and allow air to flow to the HEGA filter 44 when the filter is in use, as shown in FIG. 4, for example.

Bypassing the HEGA filter 44 when it is not needed preserves the filter, extending its life and ensuring that it is in good condition to filter contaminants from the air when it is needed. Sealing the HEGA filter 44 when it is not in use or is not needed prevents the TEDA charcoal from absorbing ambient air and becoming saturated with impurities from that air, further maintaining its effectiveness when it is needed. If the HEGA filter media 44 is not sealed when not in use, it would need to be replaced more often to maintain effectiveness, increasing maintenance requirements and costs.

FIG. 1 shows the inlet damper 26 pivotally connected to the housing 16 in the inlet portion 18, or to a frame welded to the housing 16, about a hinge 41, for example. In FIG. 1, the damper 26 is in a first position for normal decontamination operation. Room air A and external air B are drawn into the system 10 through the inlets 18a, 18b of the inlet portion 18, respectively. The damper 26 extends across the inlet 18a to modulate the flow of external air B into the system 10.

Figure 2A:
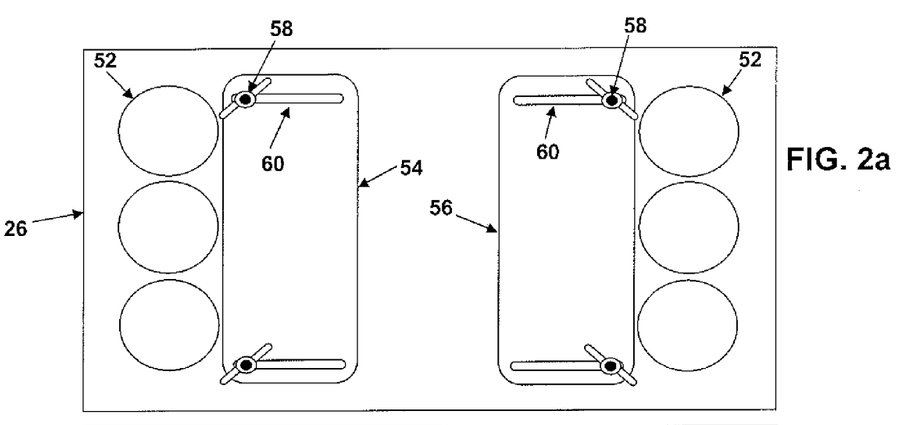
FIGS. 2a-2c are front views of examples of inlet dampers showing two rows of openings and two optional sliding covers that may be selectively moved over the openings, for use in the air processing system of FIG. 1.

FIG. 2a is a front view of an example of the damper 26, showing two rows of openings 52 through the damper and two optional sliding covers 54, 56 that may be selectively moved over the openings. In this example, the sliding covers 54, 56 are attached to the damper 26 by wing nuts 58 positioned within slots 60. The position of the sliding covers 54, 56 with respect to the openings 52 may be manually adjusted by loosening the wing nuts 58, moving the covers 54, 56 to a desired position, and then tightening the wing nuts. Alternatively, the sliding covers 54, 56 may be mechanically or electromechanically moved by suitable devices (not shown). By suitably sizing the openings and selectively covering one or both of the rows of openings 44 by the sliding covers 54, 56, predetermined amounts of external air B may be drawn into the system 10 by the blower 34.

Preferably, in normal operation, substantially more room air A is drawn into the device than external air B, to create a positive pressure in the room. In one example, between about 80% to about 85% of the air entering the device through the inlet portion 18 is room air A and between about 20% to about 15% is external air B. A damper 26 with open areas of about 20% of the total area of the damper, positioned across the inlet 18b, will modulate the amount of external air B drawn into the inlet 18b to about 20% and will not modulate the amount of room air A drawn into the inlet 18a. The damper 26 may be rotated about the pivot to extend across the inlet 18a, in which case the amount of room air A drawn into the system 10 would be modulated to 20% and the external air would not be modulated, as discussed further, below.

Figure 2B:
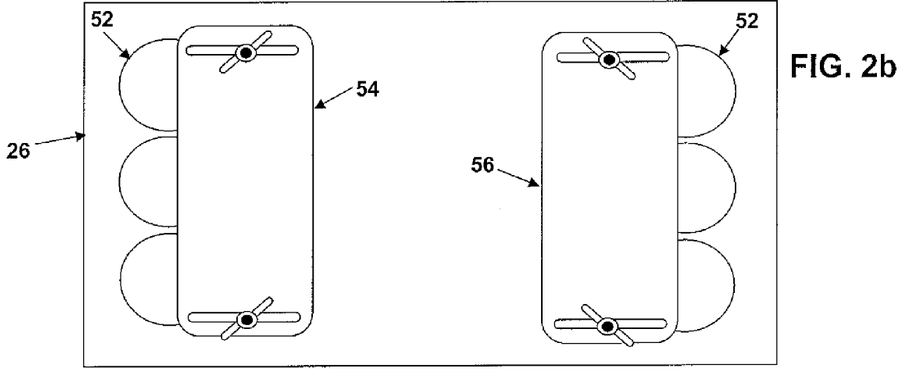
Figure 2C:
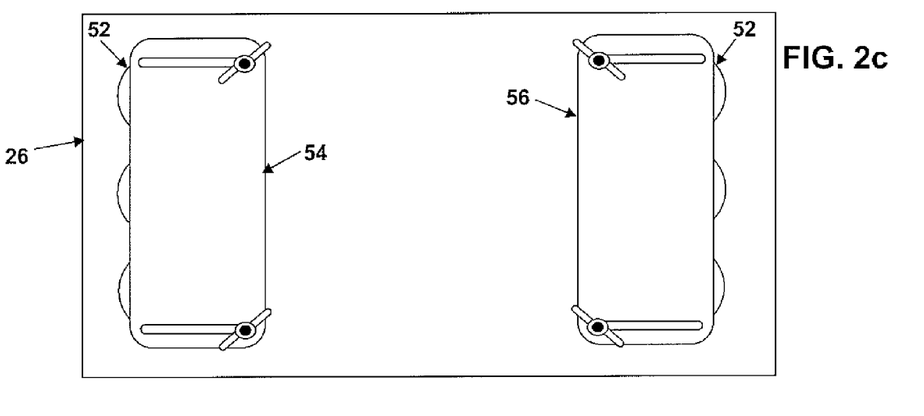

Other proportions may be used, as well. For example, FIG. 2b shows the sliding covers 54, 56 cover about 40% of the openings 52. In this case, about 13% of either external air B or room air A will enter the inlet portion 18 and the remainder would be room air A or external air B, depending on the position of the damper 26. In FIG. 2c, the sliding covers 54, 56 cover about 80% of the openings 52. In this case, about 5% of either external air B or room air A will enter the device and the remainder will be room air A or external air B, depending on the position of the damper 26.

A positive pressure of 0.01 inches WC (water column) may be created in the safe room 14, for example, by use of the damper 26 configured as in FIG. 2a. The positive pressure within the safe room 14 prevents or decreases the entry of external, non-processed air into the room, through a door 72, window 74, or other points, decreasing the risk of contamination of the room by the external, non-processed air.

The dampers 26, 28, 30 may be rotated about the hinges 41, 76, 78 by a motor or solenoid (not shown), for example. Alternatively, the sealing dampers 28, 30 may be manually controlled by engagement of handles (not shown) coupled to the dampers 28, 30 and protruding from the housing, for example. The handles may be movable across a curved slot that follows the arc of rotation of the respective damper 28, 30. Cranks may be provided to turn each damper 28, 30 about a respective hinges 76, 78. Instead of being a pivoting damper, the dampers 26, 28, 30 may be one or more sliding dampers that are moved laterally across a respective outlet, or other types of valves.

FIG. 3 shows the safe room 14 after the door 72 is opened. Certain details of the system 10 shown in FIG. 1 are not shown in FIG. 3, for ease of illustration. Sensors 75, 77 are provided to detect whether the door 72 and window 74 are opened, respectively. Since the pressure in the room is positive, air will rush out of the open door 72, causing a drop in pressure. To make up for the escaping air, the inlet damper 26 is moved to a second position where the damper fully opens the inlet 18b to external air B and partially closes the inlet 18a to room air A, as shown. In this example, the damper 26 is configured as shown in FIG. 2a. Between about 80% to about 85% of the air drawn into the device is external air B and between about 20% to about 15% is room air A. The pressure and air flow within the safe room 14 may thereby be increased to about 0.10 inches WC, for example, to continue to force the room air A out of the room, through the open door 72, window 74, and other leakage points, preventing contaminated external air B from entering the room.

If it is desired to reverse the ratio of room air B to external air A when a door 72 or window 74 is opened (such as to switch from 80% room air A/20% external air B during steady state conditions to 20% room air A/80% external air B when the door 72 is opened), then the damper openings 52 may then be suitably sized to achieve the proportions. The sliding covers 54, 56 are not then necessary. However, the sliding covers 54, 56 may still be advantageous to enable optimization of the ratios (even if opposite ratios are to be used in the steady state and non-steady state conditions), for a particular room 14.

Preferably, no more than the minimum amount of external air B necessary to provide the minimum required positive pressure in a particular safe room 14 is drawn into the system 10 to maintain energy efficiency in the cooling or heating of the room. If it is desired to switch between different proportions of room air A to external air B (such as to switch from 85% room air A/15% external air B during steady state conditions to 20% room air A/80% external air B when the door 52 is opened), automatically controlled sliding covers 54, 56 may be used to vary the proportions. Different proportions may be used dependent upon whether a door 72 or window 74 is opened, as well, based on the size of the respective door and window. If multiple doors 72 and/or windows 74 of different sizes are provided in a room 14, then the proportion may vary based on which door or window is opened, as well.

The sensors 75, 77 may be magnetic sensors, such as reed switches comprising a first circuit portion connected to the door 72 or window 74 and a second circuit portion connected to a doorframe or window frame, for example. When the door 72 or window 74 is closed, the circuit is normally closed. When the door 72 or window 74 is opened, the circuit is opened and a relay 82 is activated, causing the motor or solenoid, for example, to move the damper 26 about the hinge 41, from the first position of FIG. 1 to the second position of FIG. 2. When the door 72 or window 74 is again closed, closing the sensor circuit, the relay 82 is released, causing the motor or solenoid to return the inlet damper 19 to the first position of FIG. 1. Most of the air entering the system 10 is again room air A. One or more pressure sensors 84 may be provided in the room 14 instead of or in addition to the position sensors to control the inlet damper 26. The pressure sensor 84 may be coupled to a relay 82 as well. Screw mounted proximity switches available from Allied Electronics, Inc., Syracuse, N.Y., Part No. 808-9105 (hermetically sealed reed switch) and Part No. 808-9145 (magnet actuator) may be used, for example.

The configuration of the covers 54 and the openings 52 of the damper 26 are typically based on compensating for the maximum amount of air that would be lost if either the door 72 or the window 74 are fully opened. If the door 72 or the window 74 are only partially opened, more external air B may be drawn into the system 10 than needed. This results in inefficient heating and/or cooling of the safe room 14. In another example, photo-detectors 79 may be provided along an edge of the frame of the window 74 and a light emitting diode ("LED") 81, may be provided on the window to monitor how far the window is opened, as is also shown in FIG. 1. The degree of rotation of the damper 26, which may further vary the proportion of external air B to room air A drawn into the system 10 by allowing air to flow around the edge of the damper opposite the hinge 41 when the damper is partially open, may be controlled based on how far the window 74 is opened. Such sensors, or other such sensors, may be provided proximate the door 72, to monitor how far the door has been opened, as well. Such sensors may be provided on the floor or on the door hinge, for example. Further controlling the amount of external air B received by the system 10 to only that which is needed to make up for the air lost due to the degree of opening of the door 72 or window 74 enables more efficient operation.

FIG. 4 shows the first and second outlet dampers 28, 30 in the first and second outlets 20, 22, in second positions, to which they would be moved during or after an actual or suspected chemical or nuclear incident, to allow air flow through the HEGA filter 44 for removal of chemical and radiological agents. The first outlet damper 28 is moved to a second position closing the first outlet 20 and the second outlet damper 28 is moved to a second position opening the second outlet 22. Air drawn into the system 10 is blown through the HEGA filter 44 and out of the system, into the safe room 14 through the second outlet 22. As above, the positive pressure prevents or at least decreases the entry of non-processed external air B into the room and through the doors 72, windows 74, or other leakage points. When the emergency is over, the first and second outlet dampers 28, 30 may be returned to their first positions opening the first outlet 20, closing the second outlet 40, and sealing the HEGA filter 44. The first and second outlet dampers 28, 30 may be manually controlled via handles (not shown) coupled to the dampers and extending through the housing 16, for example. Movement of the outlet dampers 28, 30 may also be electronically controlled by activation of a switch providing an input to the motors or solenoids driving the dampers 28, 30, for example.

Figure 5:
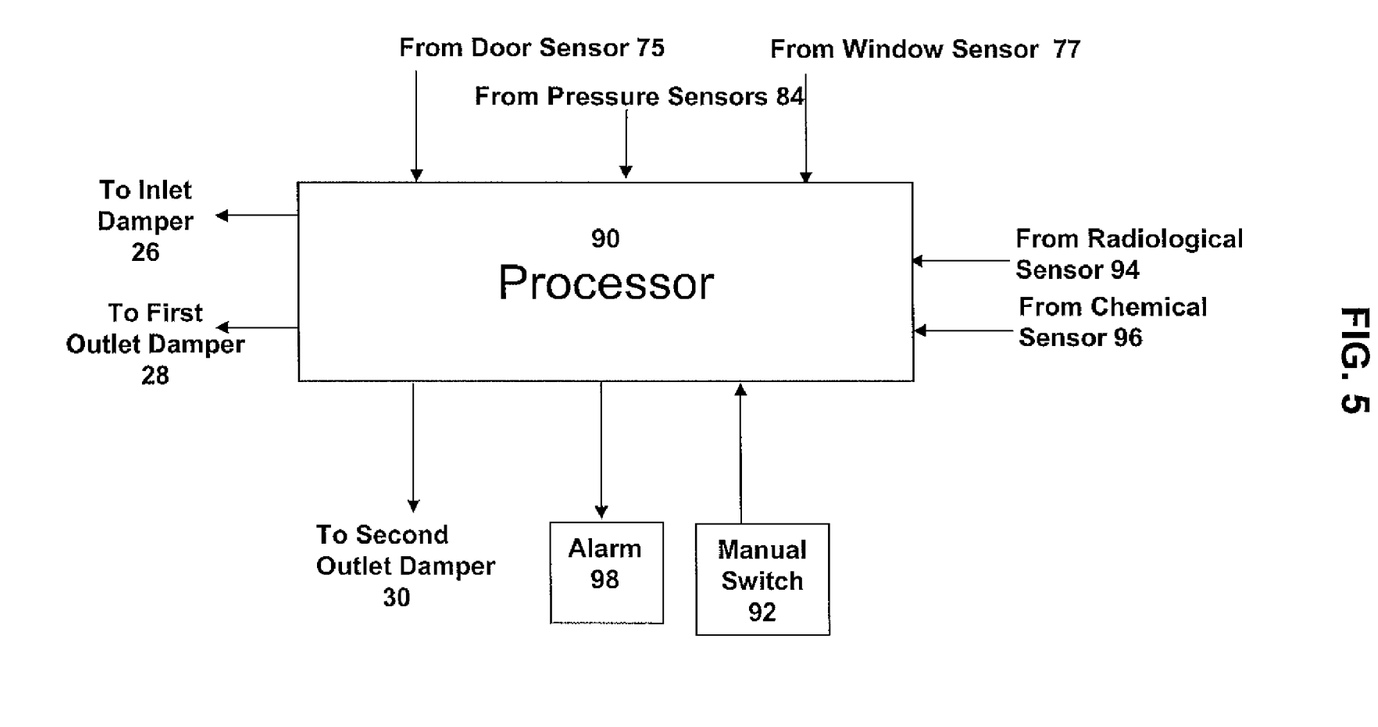
FIG. 5 is a schematic diagram of a processor for controlling operation of the air processing system of FIG. 1.

The air processing system 10 may be controlled by a processor 90, such as a microprocessor or computer. FIG. 5 is a schematic diagram of such a processor 90, which is coupled to the sensors 75, 77 to monitor the state of the door 72 and window 74, respectively. If one or more pressure sensors 84 are provided, they may be coupled to the processor 90, as well. The processor 90 may also be coupled to a manually operated switch 92, to control the dampers 28, 30. Outputs from the processor 90 to the dampers 26, 28, 30 are also shown. The processor 90 may be in any convenient location, such as attached to or within the housing 16 of the system 10, for example.

Chemical sensors 94 and radiological sensors 96 may also be provided outside and/or inside of the safe room 14 to detect chemical and/or nuclear substances in the air, respectively. The sensors 94 and 96 may be outside the building containing the safe room 14 and/or outside the same room and inside the building. Preferably, sensors 94, 96 are provided both inside and outside of the building. The sensors 94, 96 may be coupled to the processor 90, which may be programmed to take suitable action in response to signals received from the sensors. For example, the processor 90 may be programmed to operate the dampers 28, 30 to close the second outlet 20a and open the third outlet 22 so that processed air can flow through the HEGA filter 44, if the radiological or chemical sensors 96, 94 indicate that a radiological or chemical agent has been detected. The processor 90 may also activate an alarm 98 to warn people that a chemical or biological incident has taken place and that they should enter the safe room 14. Other suitable switching and alarm mechanisms to warn residents or other users may be provided instead of the processor 90. If the sensors 94, 96 no longer detect the substance, or detect less than the threshold, the dampers 28, 30 may be automatically returned to their first positions opening the first outlet 20a and sealing the HEGA filter 44.

The radiological sensors 94 may be one or more Geiger counters, for example. Sensors 96 to detect the presence of one or a plurality of chemical vapors are also available. A multi-gas spectrum analyzer may be used to detect the presence of multiple chemical vapors of concern, such as carbon dioxide ($CO_2$), carbon monoxide (CO), chlorine (Cl), diethylene oxide ($C_4H_8O$), hydrogen sulfide, hydrogen cyanide, ammonia, phosphine, sarin, and mustard gas, for example. Such analyzers are available from Industrial Environmental Monitoring Instruments, Inc., Worthington, Ohio, and AIM Safety Company Inc., Houston, Tex., for example. Individual sensors to detect respective ones of these and other chemicals are readily commercially available, as well.

A sensor (not shown) is also preferably provided to monitor the condition of the HEPA filter 34, as is known in the art. The alarm 98 or another alarm or a light on a control panel, for example, may be activated if the efficiency falls below a predetermined limit. An example of a sensor that may be used is a Dwyer Controls Model No. 1910-00 Manometer, which has a pressure range of from about 0.7 inches WC to about 0.15 inches WC, which has an adjustable set point. If the pressure drop across the HEPA filter 34 is greater than the set point, indicating that the filter has deteriorated, the alarm may be activated. Input may be provided to the processor 90 from the HEPA filter sensor, as well.

It is noted that the safe room 14 can protect people in a home or building where carbon monoxide is detected, such as from a gas leak. The sensor 96 may be a commercially available carbon monoxide detector, such as those available from First Alert, BRK Brands, Aurora, Ill., for example. If carbon monoxide is detected and an alarm goes off, a resident may enter the safe room 14 and activate a switch, such as the switch 92, or move the handles, to cause the dampers 28, 30 to be moved from their first positions to their second positions to direct air to the HEGA filter 44. This may be completely automatic in response to the sensor 96, as well. The processor 90 may control this process, for example. The positive pressure created and maintained in the room would also keep carbon monoxide from entering the room. An effective, dedicated carbon monoxide filtration device need not include the decontamination section 32. Neither would an air processing system solely for chemical and/or radiological filtration.

Figure 6:
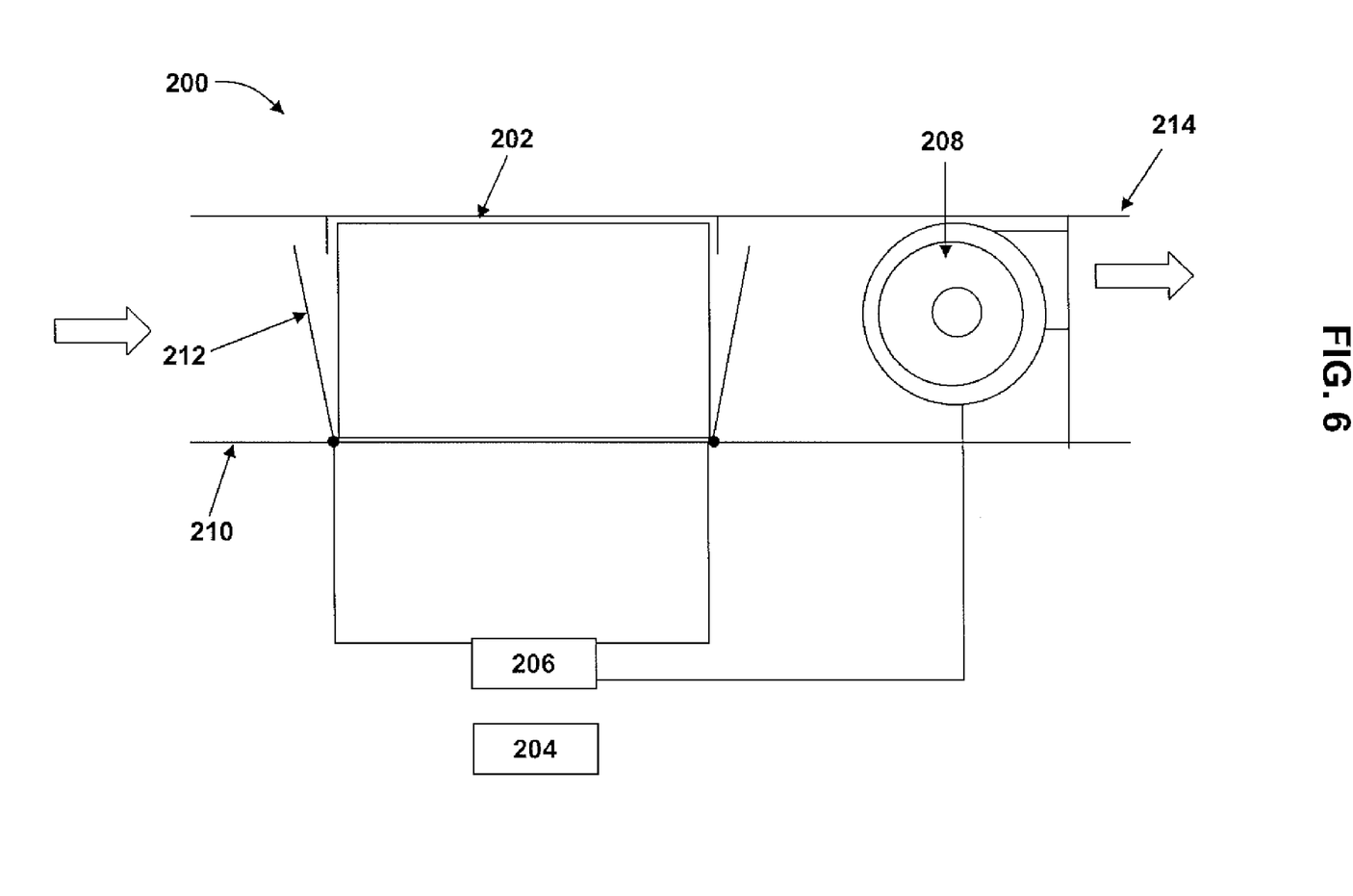
FIG. 6 is a schematic diagram of HEGA filter system in accordance with another embodiment of the invention.

A carbon monoxide detector may be coupled to a freestanding HEGA filter, such as the HEGA filter 44, for automatic activation of the filter if carbon monoxide is detected, in accordance with another embodiment of the invention. FIG. 6 is a schematic diagram of such a system 200 comprising a HEGA filter 202, one or more sensors 204, a switch or processor 206, and a blower 208. The HEGA filter 202 has an inlet 210, including a pivotally attached damper 212, and an outlet 214, including a pivotally attached damper 216. The blower 208 may be upstream or downstream of the HEGA filter 202. The blower 208 in this example is downstream of the outlet 214 of the filter 202. The dampers 212, 214 are preferably sealing dampers and their rotation about respective pivots, which may be hinges, may be controlled, as described above. The dampers 212, 214 are normally in a position to seal the input and output sides of the HEGA filter 202, when filtration is not needed. Sliding dampers or other types of valves may be used instead of the pivoting dampers.

If the sensor 204, which may be outside of the safe room 14, as well as inside the safe room, detects carbon monoxide, the processor 206 causes the dampers to open the inlet and outlet sides of the HEGA filter 202 and the blower to start. An alarm 46 is preferably turned on, as well. Air is drawn into the HEGA filter, which removes the carbon monoxide. When the sensors 204 indicate that no or less than a threshold amount of carbon monoxide is present, the processor 206 turns off the blower 208 and causes the dampers 212, 214 to return to their normal position sealing the HEGA filter 202. The dampers may be manually controlled or controlled by a switch or relay, as well.

Figure 7:
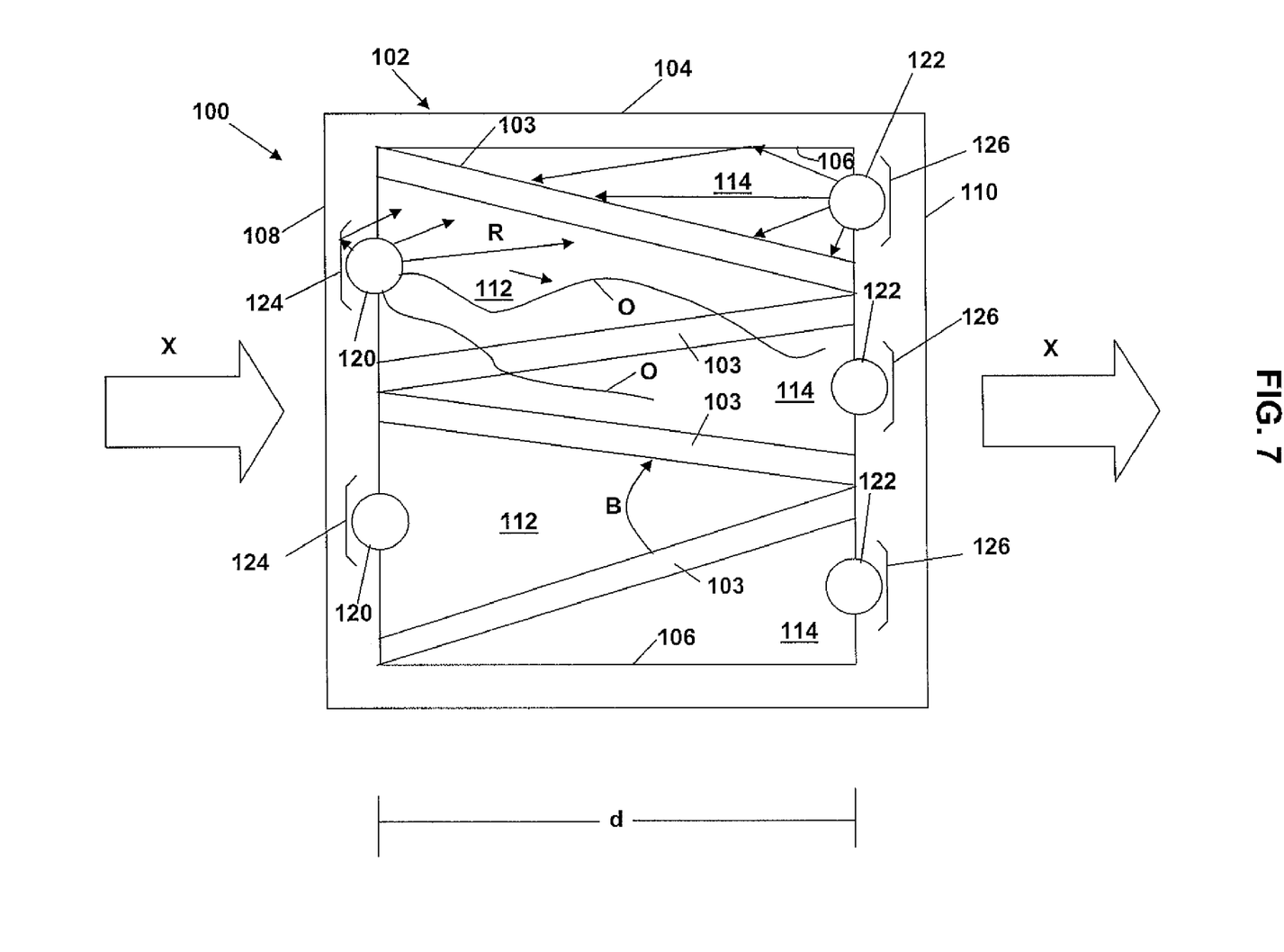
FIG. 7 is a schematic diagram of a preferred air decontamination section for use in the air processing system of FIG. 1.

FIG. 7 is a schematic representation of a preferred air decontamination section 100 for use in air processing system 10 of FIG. 1. Such an air decontamination device is available from FailSafe Air Safety Systems Corp., Tonawanda, N.Y. The air decontamination section 100 comprises a V-bank filter 102 comprising a plurality of transverse intersecting walls 103. The filter 102 is supported in a filter case 104 with top and bottom walls and two side walls. Preferably, a surface 106 of the filter case 104 facing the filter media is reflective to ultraviolet ("UV") light. For example, the surface 106 may be aluminum. Air flow enters the upstream side 108 of the filter 100 and exits the downstream side 110 of the filter. The transverse intersecting walls 103 define upstream facing, open faced V-shaped chambers 112. Downstream facing, open faced V-shaped chambers 114 are defined by the walls 103 and the filter walls of the casing 104. The open faced chambers 112, 114 may be defined by a filter wall or walls having other configurations, as well. Each V-shaped region 112, 114 may extend over an arc B of about 30 degrees. The depth of the V-shaped regions may be about 11½ inches (29.2 cm), for example.

UV lamps 120 upstream of the filter 102 and UV lamps 122 downstream of the filter are preferably supported at least partially within the upstream facing chambers 112 and the downstream facing chambers 114 of the filter 102. The ultraviolet lamps 120, 122 preferably provide ultraviolet germicidal irradiation ("UVGI") "R" at germicidal levels at the filter surfaces 102a, 102b. Radiation R is only shown being emitted by the upper UV lamps 120 and 122, for ease of illustration. The other UV lamps 120, 122 emit radiation R, as well. UVGI is in a range of from about 2250 to about 3020 Angstroms for air/surface disinfection and sterilization. Reflectors 124, 126 are provided outside of the chambers 112, 114 but close to the UV lamps 120, 122, to direct and concentrate UV germicidal irradiation (UVGI) R emitted in a direction away from a respective chamber 112, 114 toward the chamber, improving the germicidal effect of the UVGI in the filter media. The ultraviolet lamps 120, 122 and/or the reflectors 124, 126 may be supported by the filter case 104 or by the housing system 10. Examples of germicidal UV lamps include PerkinElmer Model GX018T5VH/Ultra-V, Perkin Elmer Optoelectronics, Salem, Mass., for example. The positioning of the UV lamps 122, 124 and the reflectors 124, 126 enable complete and continuous illumination of the media surfaces of the upstream side 108 and downstream side 110 of the filter 102, respectively, during operation.

The upstream UV lamps 120 may also be ozone generating lamps. The air flow A pulls the ozone "O" through the filter 102, increasing the germicidal effect through the filter. Ozone O is only indicated for the upper UV lamp 120, for ease of illustration. The lower UV lamp 120 could emit ozone O, as well. The entire filter 102 may then become a germicidal killing zone through its entire depth. Additionally, ozone facilitates the breakdown of odorants and some toxic gases, further decontaminating the air passing through the filter 102. The downstream lamps 124 may also be ozone generators. An example of an acceptable ozone generating UV lamp is a Model GX018T5L/Ultra-V manufactured by Perkin Elmer Optoelectronics, Salem, Mass. 01970 USA. Alternatively, the UV lamps 120 and/or 122 need not be the ozone generators. Other types of ozone generators may be provided, such as corona wires, are known and readily available, as described in the '041 application and the '1041 publication.

If ozone generators are provided, the UV lamps 124 downstream of the filter 102 may produce UV radiation R at wavelengths that facilitate the breakdown of ozone. Ultraviolet radiation in the UV "C" spectrum may be used. 255.3 nanometers is an effective wavelength, to break down ozone, for example. Ozone O is not generated while a safe room 14 is occupied.

Preferably, the filter 102 is a high efficiency filter, which traps at least 90% of particles of 0.3 microns. More preferably, the high efficiency filter 102 is a high efficiency particle arresting ("HEPA") filter that traps 99.97% of particles at 0.1 microns, at 1000 CFM (28 CMM). Most preferably, the filter 102 is an ultra high efficiency particulate arresting ("ULPA") filter that traps 99.99% of particles at 0.1 microns, at 2400 CFM (68 CMM). The filter 102 also preferably comprises a fire resistant filter media of such fiberglass. Fiberglass is also translucent to ultraviolet ("UV") light. Transmission of the UV light into and through the filter 102 is thereby facilitated. Some UV light is scattered by the translucent fiberglass, as well. UV light passing into and through the fiberglass media irradiates pathogens on the surface and trapped inside of the filter media. It is believed that the filter 102 slows the movement of contaminants in the air, providing more time for biological agents to be killed by the UV radiation R and the ozone O (if provided), in the filter 102.

Figure 8:
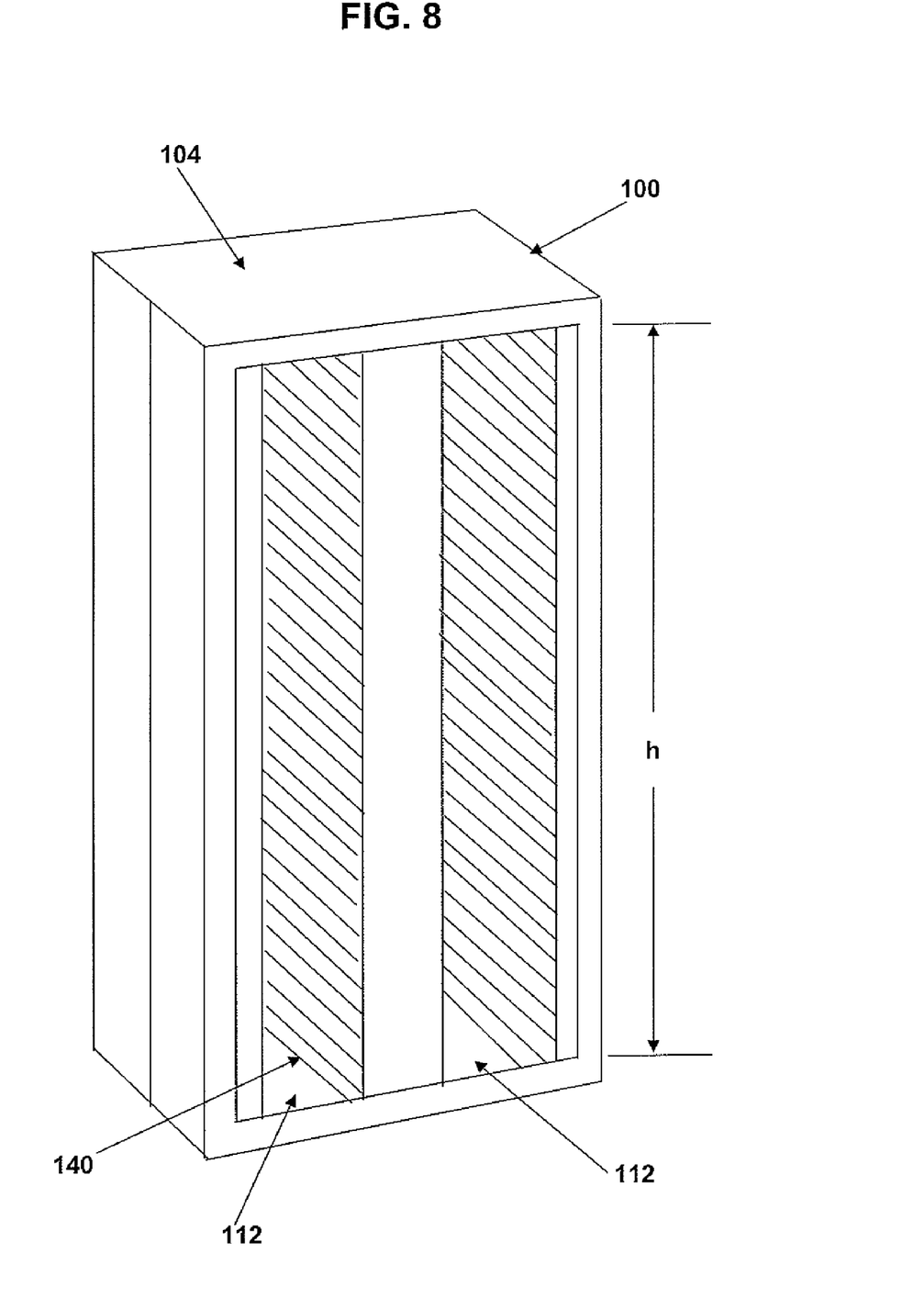
FIG. 8 is a front perspective view of a V-bank filter showing folds in the media along the lengths of each V-shaped chamber, for use in the air decontamination section of FIG. 7.

The folds in the media of the V-bank filter 102 are preferably perpendicular to the lengths of the UV lamps 120, 122, for better illumination of the filter media. FIG. 8 is a front perspective view of a V-bank filter 102 showing the folds 140 in the media along the lengths of each V-shaped chamber 112. The UV lamps 120 are partially within each V-shaped chamber 112 and extend along the height "h" of each chamber. The rear V-shaped chambers 114 have the same configuration. Such V-bank filters are commercially available from Camfil Farr, Inc. ("Camfil Farr"), Riverdale, N.J., for example, described below. The information below is provided from Camfil Farr literature.

An example of an appropriate V-bank filter 102 is the Camfil Farr Filtra 2000™ Model No. FA 1565-01-01, available from Camfil Farr, which comprises microglass fiber in an acrylic resin binder. The filters have a pleat depth of 27.5 millimeters. The Filtra 2000™ may be used in an air decontamination section 102 with an airflow of 1,100 CFM (31 cubic meters per minute), at 1.2 inches (30 mm) water column. This model has a 99.99% efficiency at 0.3 microns, when evaluated according to the IEST Recommended Practice. It has a rated check airflow of 900 CFM (25.48 CMM), at 1.0 inches (25 mm) water column. The media area is 174 square feet (16.16 square meters). The dimensions of the filter are 24 inches×24 inches×11.50 inches (length×height×depth) (0.61 meters×0.61 meters×0.29 meters). FIG. 8 is a perspective view of this model.

Camfil Farr 2000™ Model Nos. FA 1565-02-01, which is an ULPA filter providing 99.999% efficiency at 0.3 microns and 99.99% efficiency at 0.1 microns, may also be used. The dimensions and resistance at airflow of this model and the model described above are the same. The FA 1565-02-01, which has the same media area as the FA 1565-01-01 discussed above, has an airflow of 693 CFM (20 CMM) and may be used in an air decontamination section 102 with an airflow of about 1,100 CFM (31 CMM), for example.

It may also be desirable to flood the system 10 and/or the safe room 14 with ozone O, as mentioned above, for further decontamination and/or odor reduction in the room after a chemical, biological, or radiological incident, or any other time that full decontamination of the system 10 and the safe room 14 is desirable. This may be done prior to occupation or after occupation. Ozone O is not generated while a safe room 14 is occupied. The UV lamps 122, 124 and/or one or more additional ozone generators supported in the housing along the air path may be used to produce ozone that is exhausted from the first outlet 22a, into the safe room 14. In this case, if the UV lamps 124 emit radiation in a range that would break down ozone, they would not be turned on. The UV lamps 124 that break down ozone may be controlled by a separate switch or other such manual control device than that controlling the UV lamps 122, so that operation of the UV lamps 124 may be separately controlled. The UV lamps 124 may be controlled by a processor, such as the processor 90, as well. Additionally, an ozone detector (not shown) may be provided on the system 10 and/or in the safe room 14 to monitor ozone levels in the air, as discussed in '041 application and the '1041 publication, which are incorporated by reference herein. A timer (not shown) may also be provided in the system 10 to set the amount of time the ozone generators operate. A processor, such as the processor 90, may also control these operations.

In one example, the air processing system 10 for use in a safe room 14 mentioned above, which has the dimensions of about 20×22×8 feet (6.1×6.7×2.4 meters), which is 3520 cubic feet (99.68 cubic meters), using a blower that is rated at 700 CFM (0.33 cubic meters per second), may have dimensions of about 24×12×68 inches (60.1×30.5×172 cm). A safe room 14 of up to about 6,000 cubic feet (169 cubic meters) may use an air processing system 10 having a blower rated at 1,000 CFM (0.47 cubic meters per second) and dimensions of 24×15×68 inches (60.1×38.1×172 cm). A safe room 14 of up to about 12,000 cubic feet (340 cubic meters) may use an air processing system 10 having a blower rated at 2,000 CFM (0.94 cubic meters per second).

The air processing system 10 may be powered by one or more batteries, a generator, or wall voltage, for example. The amount of power needed by the air processing device 10 depends primarily on the rating of the blower 42 and the UVGI lamps 120. Enough power is preferably available for at least about 8 to about 10 hours of operation. In an air processing system 10 having a blower rated at 700 CFM (0.33 cubic meters per second) and an air decontamination section 100 described above, for example, 1,000 watts of power is preferably provided. A battery pack comprising four 85 amp per hour batteries is sufficient, for example. A 500 watt to 1,000 watt generator may also be used. Line voltage of 115 volts may also be used; however, there is a risk that during a chemical, biological, or radiological incident, there may be power failure, as well.

Heating and/or cooling of the air flow through the air processing system 10 may also be provided. A combined air decontamination, heating, ventilation, and air conditioning system is disclosed in U.S. application Ser. No. 11/089,795, filed on Mar. 25, 2005, which is assigned to the assignee of the present invention and is incorporated by reference herein. Such a combined system is available from Failsafe Air Safety Systems, Inc., Tonawanda, N.Y.

The safe room 14 may be a selected room 12 in a house, apartment, or office, for example. The room 12 preferably has one wall adjacent to an exterior of a building to facilitate ducting of external air B to the system 10, but that is not required. The air processing system 10 may operate continuously in a normal mode, as in FIG. 1, under everyday circumstances, to filter and optionally decontaminate the air in the selected room and to create a positive pressure in the room. This would be advantageous even if a chemical, biological, or nuclear incident were not taking place, particularly for people with allergies, asthma, and other sensitivities to airborne agents. In the system 10 of the example of FIGS. 1-4, if the door 72 in the safe room 14 is opened for other people to enter or if a window 74 is opened accidentally, for example, the system 10 adjusts to maintain the positive pressure in the room, as described above, whether an incident is taking place or not. This is also advantageous for those with allergies and other sensitivities to airborne agents. During a biological incident, the positive pressure established and maintained in the room 14 despite the opening of the door 72 or window 74, prevents or impedes the entry of biological agents in external air B entering through leaks in the room.

Preferably, the air decontamination section 32 of the air processing system operates continuously to decontaminate the HEPA filter 34. Biological agents are thereby continuously being trapped and neutralized. If a biological incident takes place, the system 10 will already be operating to trap and neutralize such agents in the external air B prior to the air entering the safe room 14. Continuous decontamination along with filtration is preferred because some biological agents, such as viruses, may pass though the HEPA filter 34 and decontamination also facilitates disposal of the filter. Without decontamination, the filter 34 that may be contaminated would require special handling. Continuous decontamination is not required, however, and the UV lamps 120, 122 may be activated when a biological incident is suspected, or biological agents are detected by a sensor, for example.

If the occupants of the house, apartment, or office including such a safe room 14 suspect or are informed by the news, for example, that a biological incident has taken place, they would enter the safe room 14 and close the door 72. The window 74 should already be closed. They will then be safe from biological agents such as smallpox, anthrax, SARS, etc. There is also no risk that the oxygen in the safe room 14 wilt be depleted because the room air A is constantly being replenished with decontaminated external air B.

If sensors 94, 96 detect chemical or radiological agents, respectively, the alarm 98 may be activated by the processor 90, for example, to alert the occupants to go to the safe room 14. The occupants of the house, etc., may also suspect (by a peculiar odor, for example) or be informed (by the news, for example) that a chemical or radiological incident has taken place, in which case they would also go into the safe room 14 and close the door 72. The processor 90 may automatically place the air processing system 10 into the second mode to direct air through the HEGA filter 44, as shown in FIG. 4. If this cannot be done automatically in a particular air processing system 10, then a person would activate a switch or move handles to cause the dampers 28, 30 to move to a position to enable air flow through the HEGA filter 44. The HEGA filter 44 removes chemical and radioactive vapors from the external air B prior to the air entering the room. The positive pressure prevents or impedes the entry of such vapors into the room 14. An alarm may be provided to alert residents to go to the safe room, as discussed above. The alarm may be activated by the sensors 94, 96 detecting chemical or radiological vapors, the processor 90, or manually. If after the first occupants enter the room additional occupants need to enter, they may do so through the door 72 without causing a drop in pressure that would endanger the initial occupants of the safe room, as discussed above. Similarly, if a window 74 is opened, the loss in pressure will be compensated. It is recommended that food and water be stored in the safe room 14, as well, in case an extended stay in necessary.

Aspects of the invention may also be useful in hospitals, for example. The ability to maintain a positive pressure in a safe room would be useful in rooms with patients with weakened immune systems, to keep out pathogens, even if a door is unexpectedly opened. Positive pressures could also be better maintained in operating rooms.

While the discussion above focused on safe rooms, the air processing systems discussed above may be used in any enclosed or partially enclosed space to create a safe area or space, such as a tent, a hood, a canopy, curtains used to isolate a patient, etc. A change in the positive pressure condition within the enclosed or partially enclosed space due to opening of an entrance or movement of a curtain, for example, may be detected by a pressure sensor within the space. An example of a pressure sensor is discussed above.

The embodiments described above are examples of implementations of the present invention. One of skill in the art will recognize that changes may be made to the described embodiments without going beyond the spirit and scope of the invention, which is defined in the following claims.

What is claimed is:

1. An air processing system comprising:
a first inlet to receive air from a continuous space;
a second inlet to receive air external to the space;
a first outlet portion and a second outlet portion including first and second outlets, respectively, to and in communication with the space;
a first filtration portion for filtering air received from the first and second inlets and supplying the filtered air to the first outlet portion;
an isolated housing coupled to the first and second outlet portions and defining a flow path extending from the first outlet portion to the second outlet portion;
a second air filtration portion disposed in the flow path of the housing and downstream of the first outlet portion, wherein the second filtration portion is adapted to be capable of selectively filtering at least a first agent from air and the first filtration portion is adapted to not be capable of filtering the first agent from air;
wherein the second outlet portion is downstream of the second air filtration portion, wherein, during operation of the system for filtering the received air, the first and second outlets always are in communication with the first inlet; and
a valve to selectively direct air between the first outlet and the second air filtration portion;
wherein, in a first position of the valve, the filtered air received at the first outlet portion from the first filtration portion is supplied to the space only through the first outlet, and
wherein, in a second position of the valve, the filtered air received at the first outlet portion from the first filtration portion is filtered by the second filtration portion and then supplied to the space only through the second outlet.

2. The air processing system of claim 1, further comprising: a manual switch to control the valve.

3. The air processing system of claim 1, further comprising:
at least one sensor to detect at least one chemical or radiological agent; and
a processor coupled to the sensor to receive data from the sensor; wherein the processor controls the valve based, at least in part, on data received from the sensor.

4. The air processing system of claim 1, wherein: the second air filtration portion comprises a high efficiency gas absorber.

5. The air processing system of claim 4, wherein:
the valve comprises a first sealing damper selectively positionable to open the first outlet and to seal an upstream side of the gas absorber, and to close the first outlet and not seal the upstream side of the gas absorber; and
the system further comprises:
a second sealing damper downstream of the gas absorber, the second sealing damper being positionable to selectively seal a downstream side of the gas absorber and close the second outlet when the first outlet is open, and to open the second outlet when the first outlet is closed.

6. The air processing system of claim 1, further comprising:
an inlet portion defining the first and second inlet; and
a damper in the inlet portion, the damper being configured to define a proportion of room air and external air received by the first and second inlets, respectively.

7. The air processing system of claim 6, further comprising:
a processor coupled to the damper, to selectively control a position of the damper to change a proportion of room air and external air received by the first and second inlets, respectively, in response to a change in a condition in the room.

8. The air processing system of claim 1, wherein the first air filtration portion comprises an air decontamination device.

9. An air processing system comprising:
a first inlet to receive air from a continuous space;
a second inlet to receive air external to the space;
a first air filtration portion downstream of the first and second inlets to receive and filter air from the first and second inlets;
a first outlet portion including a first outlet to the space, downstream of the first air filtration portion and for receiving the filtered air from the first air filtration portion;
a second air filtration portion downstream of the first outlet portion, wherein the second filtration portion is adapted to be capable of selectively filtering at least a first agent from air and the first filtration portion is adapted to not be capable of filtering the first agent from air;
a second outlet portion including a second outlet to the space downstream of the second air filtration portion, wherein, during operation of the system for filtering the received air, the first and second outlets always are in communication with the first inlet;
an isolated housing coupled to the first and second outlet portions and defining a flow path extending from the first outlet portion to the second outlet portion, wherein the second filtration portion is disposed in the flow path;
a first valve to selectively vary a proportion of space air and external air received by the first and second inlets, respectively; and
a second valve to selectively direct air between the first outlet and the second air filtration portion,
wherein, in a first position of the second valve, the filtered air received at the first outlet portion from the first filtration portion is supplied to the space only through the first outlet, and
wherein, in a second position of the second valve, the filtered air received at the first outlet portion from the first filtration portion is filtered by the second filtration portion and then supplied to the space only through the second outlet.

10. The air processing system of claim 9, wherein the first air filtration portions comprises an air decontamination system.

11. The air processing system of claim 9, wherein: the first valve selectively varies the proportion based, at least in part, on a change in a condition of the space.

12. The air processing system of claim 11, wherein: the condition is a state of an opening to the space.

13. The air processing system of claim 12, wherein: the space is a room; and the opening is a door or window of the room.

14. The air processing system of claim 13, further comprising: at least one sensor to detect the condition of the space.

15. The air processing system of claim 14, further comprising: a processor coupled to the sensor and to the first valve to selectively control operation of the first valve based, at least in part, on data provided by the sensor.

16. The air processing system of claim 10, further comprising:
an inlet portion defining, at least in part, the first inlet and the second inlet:
wherein: the first valve comprises a damper in the inlet portion, the damper being configured to define the proportion; and the damper being selectively positionable in the inlet portion to selectively change the proportion.

17. A safe space comprising:
an at least partially enclosed continuous space; and
an air processing system coupled to the space to process air in the space, the air processing system comprising:
an inlet portion defining a first inlet to receive internal air from the space and a second inlet to receive external air external to the space;
a first filtration portion for filtering the received air;
a second air decontamination portion downstream of the inlet portion and a first outlet portion including a first outlet to the space, wherein the first outlet portion receives the filtered air from the first filtration portion;
wherein the second filtration portion is adapted to be capable of selectively filtering at least a first agent from air and the first filtration portion is adapted to not be capable of filtering the first agent from air;
a second outlet portion including a second outlet to the space;
an isolated housing coupled to the first and second outlet portions and defining a flow path extending from the first outlet portion to the second outlet portion; wherein the second air decontamination portion is disposed in the flow path;
wherein the second outlet portion is downstream of the second air decontamination portion to allow processed air to enter the space from the air processing system, wherein, during operation of the system for filtering the received air, the first and second outlets always are in communication with the first inlet; and a first valve to selectively direct air between the first outlet portion and the second air decontamination portion;

wherein the inlet portion is adapted to vary quantities of internal air and external air through the first and second inlets respectively, based, at least in part, on a condition in the space;

wherein, in a first position of the first valve, the filtered air received at the first outlet portion from the first filtration portion is supplied to the space only through the first outlet, and wherein, in a second position of the first valve, the filtered air received at the first outlet portion from the first filtration portion is filtered by the second filtration portion and then supplied to the space only through the second outlet.

18. The safe space of claim 17, wherein the condition of the space is an air pressure in the space, the system further comprising:

at least one air pressure sensor in the space;

wherein the inlet portion selectively receives quantities of internal air and external air through the first and second inlets respectively, based, at least in part, on an air pressure detected by the at least one sensor.

19. The safe space of claim 17, wherein:

the space is a room;

the condition is a state of normally closed openings to the room;

at least one sensor is coupled to at least one opening to the room; and the sensor detects an opening of the at least one normally closed opening to the room.

20. The safe space of claim 19, wherein: the at least one opening is a door or window.

21. The safe space of claim 19, further comprising: a second valve in the inlet portion; and a processor to control operation of the second valve based, at least in part, on data received from the at least one sensor.

22. The safe space of claim 17, wherein the second decontamination portion is a high efficiency gas absorber.

23. The safe space of claim 22, further comprising:

a first sealing damper downstream of the gas absorber to selectively seal a downstream side of the absorber from air; wherein:

the first valve comprises a second sealing damper upstream of the gas absorber, the second damper being configured to selectively direct air to the first outlet or the gas absorber based on a position of the second damper; and the second damper is configured to seal an upstream side of the gas absorber when the second damper is in position to direct air to the first outlet.

24. A safe space comprising:

an at least partially enclosed continuous space; and an air processing system comprising:

a first inlet to receive air from a space;

a second inlet to receive air external to the space;

a first outlet portion including a first outlet to the space;

a first filtration portion for filtering air received from the first and second inlets and supplying the filtered air to the first outlet portion;

a second air filtration portion downstream of the first outlet portion, wherein the second filtration portion is adapted to be capable of selectively filtering at least a first agent from air and the first filtration portion is adapted to not be capable of filtering the first agent from air;

a second outlet portion including a second outlet to the space downstream of the second air filtration portion;

an isolated housing coupled to the first and second outlet portions and defining a flow path extending from the first outlet portion to the second outlet portion; wherein the second air filtration portion is disposed in the flow path;

wherein the first and second outlets, during operation of the system for filtering air, always are in communication with the first inlet; and a valve to selectively direct air between the first outlet and the second air filtration portion wherein, in a first position of the valve, the filtered air received at the first outlet portion from the first filtration portion is supplied to the space only through the first outlet, and wherein, in a second position of the valve, the filtered air received at the first outlet portion from the first filtration portion is filtered by the second filtration portion and then supplied to the space only through the second outlet.

25. A safe room comprising:

a room; and an air processing system coupled to the room to process air in the room, the air processing system comprising:

an inlet portion defining a first inlet to receive internal air from the room and a second inlet to receive external air external to the room;

an air decontamination portion downstream of the inlet portion and for filtering the received air;

a first outlet portion including a first outlet to the room downstream of the air decontamination portion to allow processed air to enter the room from the air processing system;

a high efficiency gas absorber downstream of the first outlet portion, wherein the gas absorber is adapted to be capable of selectively filtering a first gas from air and wherein the air decontamination portion is adapted not to be capable of filtering the first gas from air;

a first damper downstream of the air decontamination portion and upstream of the gas absorber, to selectively direct air to the first outlet and the absorber;

a second outlet portion including a second outlet to the room downstream of the gas absorber;

an isolated housing coupled to the first and second outlet portions and defining a flow path extending from the first outlet portion to the second outlet portion; wherein the gas absorber is disposed in the flow path;

wherein, during operation of the system for filtering air, the first and second outlets always are in communication with the first inlet; and a second damper downstream of the gas absorber;

wherein the first and second dampers are configured and positionable to selectively seal an upstream side and downstream side of the gas absorber;

wherein, in a first position of the first damper, the filtered air received at the first outlet portion from the air decontamination portion is supplied to the space only through the first outlet, and wherein, in a second position of the first damper, the filtered air received at the first outlet portion from the air decontamination portion is filtered by the gas absorber and then supplied to the space only through the second outlet.

26. The safe space of claim 25, wherein: the inlet portion selectively receives quantities of internal air and external air through the first and second inlets respectively, based, at least in part, on a condition in the room.

27. The air processing system of claim 1, wherein the second air filtration portion comprises a high efficiency gas absorber, the system further comprising:
- at least one sensor coupled to the absorber to detect at least one chemical or radiological agent; and
- a blower to move air through the gas absorber, the blower being coupled to the at least one sensor;
- wherein the blower is activated based, at least in part, on data received from the at least one sensor.

28. The air processing system of claim 27, wherein: the at least one sensor is adapted to detect carbon monoxide.

29. The air processing system of claim 27, further comprising:
- a first sealing damper to selectively seal an inlet side of the gas absorber; and
- a second sealing damper to selectively seal an outlet side of the gas absorber;
- wherein movement of the first and second dampers is based, at least in part, on data received from the at least one sensor.

* * * * *